United States Patent Office 3,739,016
Patented June 12, 1973

3,739,016
PERFLUORO-PHENOXYPROPIONIC ACID AND ESTERS AND SALTS THEREOF
Richard W. Quarles, Jr., Wilmington, Del., assignor to E. I. du Pont de Nemours and Company, Wilmington, Del.
No Drawing. Original application Mar. 18, 1970, Ser. No. 20,806. Divided and this application June 28, 1972, Ser. No. 267,108
Int. Cl. C07c 69/76
U.S. Cl. 260—473 G     2 Claims

ABSTRACT OF THE DISCLOSURE

Novel compounds of the formula

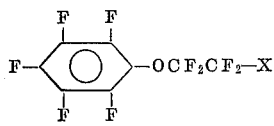

are provided wherein X is —COF, —COCl, —COOH, —COOR, —COOM, —CONR₁R₂, or —CN wherein R is an alkyl radical, M is a metal, and R₁ and R₂ are independently hydrogen or alkyl radicals. Also provided are novel compounds of the formula $$C_6F_5OCF_2CF_2CF_2OCF(CF_3)X$$

wherein X is as defined above. These novel compounds are useful in the preparation of perfluoro(3-phenoxypropyl vinyl ether) monomer, said monomer being useful in the preparation of copolymers having improved oxidative stability.

---

This is a division of application Ser. No. 20,806, filed Mar. 18, 1970 now U.S. Pat. 3,694,499.

BACKGROUND OF THE INVENTION

Fluorine-containing copolymers ranging from low molecular weight oils to high molecular weight plastics are of outstanding industrial importance due to their exceptionally good thermal and chemical stability. With the advent of space technology there has arisen a critical need for materials capable of withstanding elevated temperatures in highly oxidative atmospheres. A variety of fluorinated monomers have been developed in an attempt to produce copolymers having the desired resistance to environmental attack. However, the fluorinated monomers of the prior art have not proven entirely satisfactory. For example, attempts to form copolymers of the octafluorovinyl phenyl ether monomer disclosed by Wall and Pummer in U.S. Pat. 3,192,190 with other fluorine containing monomers have proven unsuccessful and completely fluorinated copolymers prepared with perfluoroalkyl perfluorovinyl ethers disclosed in U.S. Pat. 3,132,123 to Harris and McCane have proven difficult to cure by conventional methods. Thus there is a need for compounds which are useful in the preparation of perfluorinated monomers which are readily copolymerizable with other fluorine-containing monomers and which are cure-site monomers capable of crosslinking wholly perfluorinated copolymers.

THE INVENTION

In accordance with this invention, there are provided novel compounds of the formula

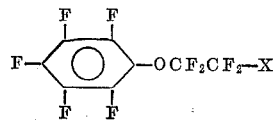

wherein X is —COF, —COCl, —COOH, —COOR, —COOM, —CONR₁R₂ or —CN wherein R is an alkyl radical, M is a metal, and R₁ and R₂ are independently hydrogen or alkyl radicals. These compounds are useful in the preparation of a perfluoro(3-phenoxypropyl vinyl ether) monomer and useful polymers prepared therefrom.

The novel compounds above described wherein X is —COOM are prepared by heating, in a moisture free inert atmosphere, about 1 mole of a metal salt of pentafluorophenol with about 1–3 moles of tetrafluoroethylene and at least about 1 mole of carbon dioxide in an anhydrous, polar aprotic solvent at 50–200° C. under autogenous pressure. The corresponding free acid, acid fluoride, acid chloride, ester, amide and nitrile derivatives are prepared from the acid salt thus prepared in accordance with conventional methods well known in the art.

Perfluoro(3-phenoxypropyl vinyl ether) polymerizable monomer which has the formula:

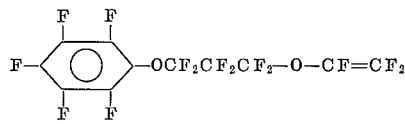

is prepared by reacting, in a moisture free inert atmosphere, about 1 mole of perfluoro(3-phenoxypropionyl fluoride) with about 1 mole of hexafluoropropylene oxide and pyrolyzing the resulting reaction product at a temperature of about 200–300° C. The reaction between the propionyl fluoride and the hexafluoropropylene oxide is carried out at a temperature of from about —80° C. to about 150° C. in a polar, aprotic, organic solvent. Such polymerizable monomers can, of course, also be prepared by converting the acid fluoride, resulting from the reaction of perfluoro(3-phenoxypropionyl fluoride) with hexafluoropropylene oxide (this acid fluoride and its derivatives, compounds of the formula $$C_6F_5OCF_2CF_2CF_2OCF(CF_3)X$$

wherein X is as hereinbefore described, are also novel compounds) to the corresponding carboxylic acid salt and pyrolyzing the acid salt.

The resulting monomer is a superior cure-site monomer in that it can be copolymerized by conventional methods with at least one fluorine containing ethylenically unsaturated comonomer to prepare readily vulcanizable copolymers, vulcanizates of which exhibit exceptionally improved oxidative stability at elevated temperatures. Vulcanizates of such copolymers exhibit excellent heat aged tensile properties, such as tensile strength at break, and retain useful, heat-aged, tensile properties for exceptionally long periods of time.

Perfluorophenol and its alkali metal salts are known compounds and are described, for example, by Wall et al. in the Journal of Research of the National Bureau of Standards A. Physics and Chemistry, vol. 67A, pages 481–497 (1963).

Hexafluoropropylene oxide is also a known compound and can be made by the action of alkaline hydrogen peroxide on perfluoropropylene at a temperature of about 30° C.

When X is —COOM, M is preferably an alkali metal, and most preferably Na, K or Cs.

When X is —COOR in the novel compounds of the present invention, R is preferably an alkyl radical of about 1–10 carbon atoms, although it can contain up to 20 carbons.

When X is —CONR₁R₂, R₁ and R₂ are preferably independently hydrogen or alkyl radicals of about 1–10 carbon atoms, although they can contain up to 20 carbons.

Representative alkyl groups referred to above include methyl, ethyl, propyl, butyl, pentyl, heptyl, nonyl and decyl.

Preferably the above novel compounds of this invention wherein X is —COOM are prepared by heating, in a moisture free closed vessel under a nitrogen atmosphere, about 1 mole of K, Na, or Cs salt of pentafluorophenol with about 2 moles of tetrafluoroethylene and about 4 moles of carbon dioxide in an aprotic polar solvent such as tetraethylene glycol dimethyl ether, acetonitrile, dimethyl formamide or dimethyl sulfoxide at about 75–150° C. for about 2–12 hours under autogenous pressure.

The other novel compounds, above described, can be prepared from the corresponding metal salts by conventional methods. Detailed descriptions of the preparation of the acid chloride and acid fluoride from the acid salts are given hereinafter.

The perfluoro(3-phenoxypropyl vinyl ether) monomer is prepared from the novel acid fluoride

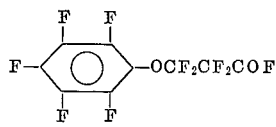

which, of course, can be prepared by conventional methods from the corresponding perfluoro(3-phenoxypropionic acid) and derivatives thereof hereinbefore disclosed.

In the preparation of the monomer, preferably about 1 mole of the novel acid fluoride is reacted, in a moisture free inert atmosphere, with about 1 mole of hexafluoropropylene oxide in the presence of an anhydrous aprotic, polar, organic solvent such as tetraethylene-glycol dimethyl ether at a temperature of about 20–50° C. for about 1–3 hours. The lower layer of the resulting product is separated and distilled under reduced pressure. The fraction distilling at about 77–78° C. at 11 mm. Hg is then pyrolyzed to yield the desired monomer.

The pyrolysis is preferably carried out under practically anhydrous conditions at a temperature of about 200–300° C. The monomer is purified by vacuum distillation and distills at about 84° C. at 20 mm. Hg.

A wide variety of comonomers can be copolymerized with the novel monomer of this invention. Useful comonomers include trifluoroethylene, tetrafluoroethylene, chlorotrifluoroethylene, hexafluoropropylene, vinylidene fluoride, 1,1,3,3,3-pentafluoro-1-propene, 1,2,3,3,3-pentafluoro-1-propene and perfluoroalkyl perfluorovinyl ethers. Perfluorinated comonomers such as tetrafluoroethylene, hexafluoropropylene, and perfluoroalkyl perfluorovinyl ethers containing about 3–8 carbon atoms, as described in U.S. Pat. 3,180,895 to Harris and McCane, are particularly useful.

A wide variety of conventional copolymerization methods can be employed to prepare such copolymers. Vulcanization of the copolymers can be effected by conventional curing agents such as amine-based curing.

The following examples illustrate the invention. All parts, percentages and proportions are by weight unless otherwise indicated.

All reactions were carried out under a nitrogen atmosphere in such a fashion as to exclude moisture unless noted otherwise.

EXAMPLE 1

Synthesis of $C_6F_5OCF_2CF_2CO_2Cs$

One pound (1.4 moles) of $Cs_2CO_3$ and 700 ml. tetraethyleneglycol dimethyl ether were placed in a 3-neck 2-liter round bottom flask equipped with a mechanical stirrer, thermometer and dropping funnel and provided with a dry nitrogen atmosphere. To this stirred suspension was added dropwise a solution containing 214 g. (1.16 moles) of $C_6F_5OH$ and 200 ml. of tetraethyleneglycol dimethyl ether. After the addition was completed, the reaction mixture was heated to approximately 75° C. for ½ hour, and then cooled to room temperature.

Into a 400 ml. stainless steel shaker tube was placed 200 ml. of this solution. After closing the tube, 40 g. (0.4 mole) tetrafluoroethylene and 50 g. (1.15 moles) carbon dioxide were condensed in. The tube was heated at 85° C. under autogenous pressure for 4 hours. After venting the shaker tube, the solution was drowned in approximately 1200 ml. of benzene. The resulting precipitate was washed with benzene and air dried. Yield of $C_6F_5OCF_2CF_2CO_2Cs$ was 84.5 g. (71%, based on the amount of $C_6F_5OH$ taken).

The infra-red spectrum of the salt was consistent with the proposed structure, having a strong absorption at 6.6$\mu$, characteristic of the pentafluorophenyl ring, and a carbonyl absorption at 5.9$\mu$, characteristic of the carboxylate salt.

EXAMPLE 2

Synthesis of $C_6F_5OCF_2CF_2CO_2Na$

Into a 3-neck 500 ml. round bottom flask, equipped as above, was placed 40 g. (377 mmoles) $Na_2CO_3$ and 100 ml. of tetraethyleneglycol dimethyl ether. To this stirred suspension was added 58.4 g. (317 mmoles) $C_6F_5OH$ dissolved in 100 ml. tetraethyleneglycol dimethyl ether. After heating to 70° C., the odor of phenol was still strong, so 200 ml. $H_2O$ was added to increase the solubility of the $Na_2CO_3$. The solution was heated to reflux overnight.

The bulk of the water was distilled off with the aid of a water pump. The system was then evacuated to the full vacuum of a mechanical pump (ca. 10$\mu$) and approximately ⅓ of the remaining volume distilled off. The remaining solution was transferred to a 400 cc. stainless steel shaker tube, pressured with 40 g. (909 mmoles) $CO_2$ and 40 g. (400 mmoles) TFE and heated to 180° C. under autogenous pressure for 7 hours. After venting the shaker tube, the reaction mixture was drowned in benzene. The precipitate of $C_6F_5OCF_2CF_2CO_2Na$ was filtered, washed with benzene and then ether, and dried. The yield was 53 g. (48%, based on $C_6F_5OH$).

The infra-red spectrum of the salt was consistent with the proposed structure, having a strong absorption at 6.6$\mu$, characteristic of the pentafluorophenyl ring, and a carbonyl absorption at 5.9$\mu$, characteristic of the carboxylate salt.

EXAMPLE 3

Synthesis of $C_6F_5OCF_2CF_2CO_2K$

Into a 3-neck 5 l. round bottom flask, equipped as above, was placed 3 pounds (9.9 moles) $K_2CO_3$ and approximately 3 l. $CH_3CN$. To this was added a solution of 1 kg. (5.44 moles) $C_6F_5OH$ dissolved in approximately 1 l. $CH_3CN$. The reaction mixture was heated to reflux for 24 hours, cooled to room temperature, and allowed to stand overnight. The solution was decanted from the precipitate and the remaining suspension filtered and then washed with $CH_3CN$. From the solution, 16–200 ml. aliquots were made, plus 2–200 ml. aliquots of wash solution. These 200 ml. aliquots were placed in a 400 ml. stainless steel shaker tube, the tube was pressured with 50 g. (0.5 mole) tetrafluoroethylene and 50 g. (1.15 moles) $CO_2$ and heated at 100° C. for 3½ hours. After venting the shaker tube, the cake of product was dried in a vacuum oven at 80° C. overnight. The yield from 3 such runs was 308 g., corresponding to an 83% yield if the runs from the washings are ignored.

The infra-red spectrum of the salt was consistent with the proposed structure, having a strong absorption at 6.6$\mu$, characteristic of the pentafluorophenyl ring, and a carbonyl absorption at 5.9$\mu$, characteristic of the carboxylate salt.

EXAMPLE 4

Synthesis of $C_6F_5OCF_2CF_2COCl$

Into a 3-neck 1 l. round bottom flask, equipped with mechanical stirrer and reflux condenser, were placed 203 g. (555 mmoles) $C_6F_5OCF_2CF_2CO_2K$, 200–300 ml. $CH_3CN$, and 35 ml. (58.6 g., 382 mmoles) $POCl_3$. The stirred suspension was heated to reflux overnight. After cooling to room temperature, the mixture was filtered, and the precipitate washed twice with $CH_3CN$. The solution and washings were combined and distilled. The fraction boiling at 181° C. was $C_6F_5OCF_2CF_2COCl$ and weighed 153.3 g.

When the filtration apparatus was washed, a second phase, more dense than water, was notice. It was refluxed overnight with an excess of $SOCl_2$ and a few drops of pyridine, and yielded a further 21.6 g. of $$C_6F_5OCF_2CF_2COCl.$$

The overall yield was 174.9 g. (91%).

The infra-red spectrum was consistent with the proposed structure, having the absorption at 6.6μ characteristic of the pentafluorophenyl ring, and a carbonyl absorption at 5.56μ, characteristic of an acid chloride.

The fluorine nuclear magnetic resonance spectrum was also consistent with the proposed structure.

The synthesis of $C_6F_5OCF_2CF_2COCl$ can be carried out without actual isolation of the intermediate carboxylate salt. In this case, to the wet cake, from Example 3, is added excess acetonitrile and a slight stoichiometric excess of $POCl_3$, and the reaction carried out as above.

EXAMPLE 5

Synthesis of $C_6F_5OCF_2CF_2COF$

One pound of NaF (10.8 moles) and 300 ml. tetramethylene sulfone were placed into a 4-neck round bottom flask equipped with dropping funnel, mechanical stirrer, thermometer, and reflux condenser cooled with water. The top of the reflux condenser was connected to a cold finger condenser, cooled with an ice/acetone mixture, on top of a 500 ml. 2-neck flask immersed in a bath maintained at —80, the second neck on the flask being connected to the vacuum system. Into the dropping funnel was placed 550 g. (1.59 moles) $C_6F_5OCF_2CF_2COCl$. The pressure was lowered to 3 mm. Hg, the reaction pot heated to between 80° C. and 100° C. The $$C_6F_5OCF_2CF_2COCl$$

was added dropwise. After all of the acid chloride was added, the pot was heated to 120° C. to remove all product. The material collected in the receiver was redistilled, B.P. 49° C./11 mm. Hg. The yield of $C_6F_5OCF_2CF_2COF$ was 441.1 g. (84.5% based on $C_6F_5OCF_2CF_2COCl$).

The infra-red spectrum exhibits the expected pentafluorophenyl absorption at 6.6μ and the carbonyl absorption at 5.34μ.

EXAMPLE 6

Synthesis of $C_6F_5OCF_2CF_2CF_2OCF(CF_3)COF$

Into a 1 l. round bottom flask, equipped with stirrer and gas inlet, was placed 18 g. (118 mmoles) CsF, 100 ml. tetraethyleneglycol dimethyl ether, and 220 g. (667 mmoles) $C_6F_5OCF_2CF_2COF$. The flask and its contents were cooled to —80° C. and evacuated. After warming to 33–36° C., 128 g. (772 mmoles) hexafluoropropyleneoxide was added with stirring over one hour. The layers were separated. Distillation of the lower layer yielded a small amount of $CF_3CF_2CF_2OCF(CF_3)CFO$, B.P. 55° C., 70 g. (212 mmoles) $C_6F_5OCF_2CF_2CFO$, B.P. 49°/11 mm. Hg, and 92.8 g. (187 mmoles)

$$C_6F_5OCF_2CF_2CF_2OCF(CF_3)COF$$

B.P. 77–78°/11 mm. Hg (39% yield, based on 150 g. $C_6F_5OCF_2CF_2COF$ used up).

The infra-red spectrum of $$C_6F_5OCF_2CF_2CF_2OCF(CF_3)COF$$

exhibited the expected absorptions at 6.6 and 5.34μ.

EXAMPLE 7

Synthesis of $C_6F_5OCF_2CF_2CF_2OCF=CF_2$

The pyrolysis of the precursor acid fluoride, $$C_6F_5OCF_2CF_2CF_2OCF(CF_3)COF$$

was carried out using a fluidized bed reactor packed with $Na_2CO_3$ which had been dried for two days at 300° C. under a nitrogen stream.

The bed was maintained at 270–300° C. and 604 g. (1.21 moles) of $C_6F_5OCF_2CF_2CF_2OCF(CF_3)COF$ was fed by means of a syringe pump at a rate of 1 cc./min. Conversion was practically 100%, and a yield of 453.5 g. (89%) of $C_6F_5OCF_2CF_2CF_2OCF=CF_2$ obtained (B.P. 84°/20 mm. Hg).

The infra-red spectrum of the product had absorption maxima at 6.6 and 5.49μ, the latter being characteristic of a perfluorinated vinyl ether.

The fluorine nuclear magnetic resonance spectrum was consistent with the proposed structure as was the mass spectrum.

What is claimed is:

1. A compound of the formula

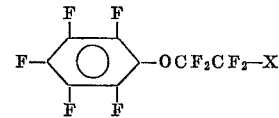

wherein X is selected from the group consisting of —COOH, —COOR and —COOM wherein R is an alkyl radical of about 1–10 carbon atoms and M is an alkali metal.

2. A compound of claim 1 wherein M is Cs, Na, or K.

References Cited

Abezgauz et al., Chem. Abst. 70 68308g (1969).

LORRAINE A. WEINBERGER, Primary Examiner

J. F. TERAPANE, Assistant Examiner

U.S. Cl. X.R.

260—521 A